Sept. 25, 1962 P. P. GRAD 3,055,777

METHOD OF ENCASING ELECTRICAL UNITS AND ASSEMBLIES WITH ONE OR MORE PROTRUDING CONTACTS

Filed Feb. 21, 1961

INVENTOR.
PETER P. GRAD
BY
Dean, Fairbank & Hirsch
ATTORNEYS 3,055,777

METHOD OF ENCASING ELECTRICAL UNITS AND ASSEMBLIES WITH ONE OR MORE PROTRUDING CONTACTS

Peter P. Grad, Woodstock, N.Y., assignor to Aerovox Corporation, New Bedford, Mass., a corporation of Massachusetts Filed Feb. 21, 1961, Ser. No. 92,729
7 Claims. (Cl. 117—212)

Figure 2:
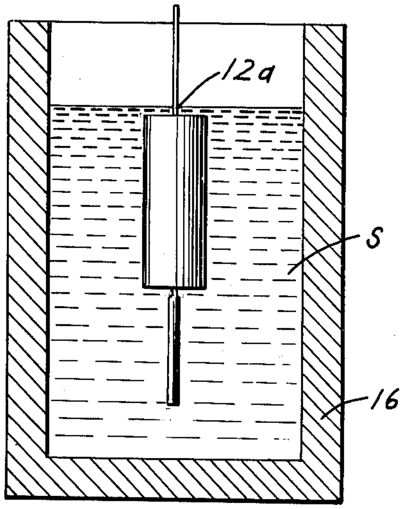

The present invention is concerned with insulation coated fixed electric or electronic units, more especially with resistors of the precision type, which have axial wire leads, although the invention is also applicable to capacitors, inductance coils, rectifiers, transistors and other insulation coated units and assemblies with one or more protruding leads, prongs or contact points.

Throughout the specification and claims the term "resistor" or "precision resistor" will be used to include also capacitors, inductance coils, rectifiers, transistors and the like as well as insulation coated assemblies more generally, that have one or more protruding leads, prongs or contact points.

As conducive to a clear understanding of the invention, it is noted that in the dipping of such units or assemblies, as for instance precision type resistors, into a bath of thermo-setting resin, such as by way of example, epoxy resin or polyester resin, for the purpose of forming an insulating coating upon such resistor and protecting it from contamination from moisture or abrasion, one of the terminals, such as an axial wire lead would incidentally become coated with such resin, which coating precludes applying thereto a terminal connection either mechanically or by soldering, unless the coating thus formed on the wire lead be first removed.

Removal of such resin by abrasion or by other means such as by dipping into a solder bath, is a time-consuming and delicate procedure, since it is important, completely to remove from the lead wire all resin thereon, and this without physical injury to the wire. Where in the attempt to avoid the complication of stripping the resin from the lead wire by abrasion, resort is had to a wax coating for the unit instead of a thermosetting resin, which wax coating may be melted off the lead wire by a properly directed flame, the wax coated unit lacks the full measure of protection attained with a thermosetting resin, and the cleaning of the lead is a more delicate and costly operation than that attained by the present invention.

It is, accordingly among the objects of the invention to provide a simple and inexpensive expedient for assuring a complete and automatic cleaning of the surface of the terminal, such as the length of a lead wire, as an incident to the curing of the resin coating on the resistor or the like, despite the fact that such wire had been coated with thermosetting resin as an incident to dipping the resistor or the like into a bath of such resin.

According to the invention, at least one of the leads of the resistor is first coated, preferably by a dipping operation, with thermo-plastic resin compound or wax of relatively low melting point or low flow point and a relatively low viscosity at temperatures slightly above its melting point. Thereupon said lead as well as the entire body of the resistor or the like is dipped into a bath of thermosetting resin having a thermosetting temperature higher than the flow temperature of said thermoplastic resin compound or wax. Preparatory to the subsequent curing of the thermosetting resin coating, the lead that had first been dipped into thermo-plastic resin compound or wax of low flow point is allowed to hang downwardly so that the thermo-plastic resin or wax coat on the wire will melt under applied heat and flow downwardly, carrying with it the encompassing thermo-setting resin coating on the lead wire, while it is still in the liquid, uncured state, so that the wire is left clean.

This application is a continuation-in-part of my copending application, Serial No. 784,605, filed January 2, 1959, now abandoned.

Figure 1:
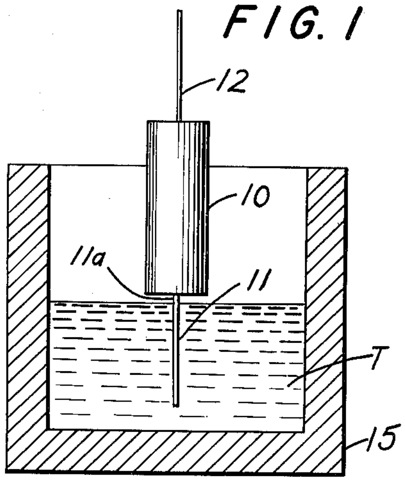
Figure 4:
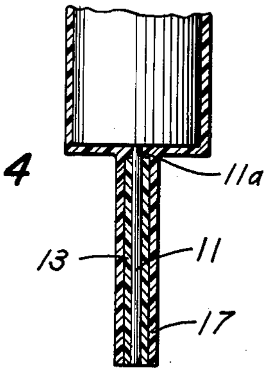
Figure 5:
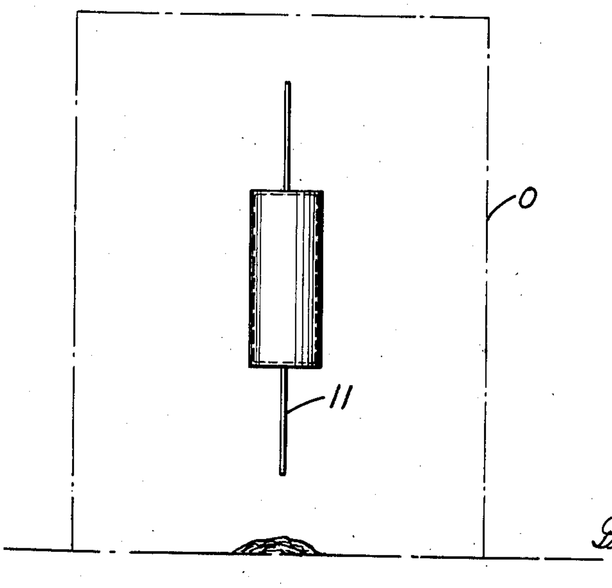
Figure 3:
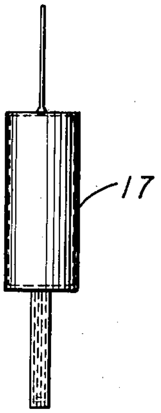

In the accompanying drawings, in which are shown one or more of various possible embodiments of the several features of the invention, FIG. 1 shows the resistor structure with one of its axial wire leads when first submerged, except for its root, in a thermo-plastic resin compound or wax bath of relatively low melting point, FIG. 2 shows the said lead wire as well as the entire surface of the resistor proper and the root end of the other lead wire when first submerged in a bath of thermo-setting resin, FIG. 3 shows the appearance of the resistor after completion of the treatments according to FIGS. 1 and 2 upon removal from the thermo-setting resin bath, showing the thermo-setting resin coating the entire surface of the resistor as well as the entire length of one wire lead, all but the root end of said lead having the underlying thermoplastic resin or wax coating, FIG. 4 is a fragmentary sectional view on a larger scale of the lead wire, coated as shown in FIG. 3, and FIG. 5 is a side elevation of the resistor after it has been heated to melt off the coatings 13 and 17 on the lead wire.

Referring now to the drawings, there is shown a fixed resistor 10 which may be of the wire-wound type and which has the usual axial wire leads 11 and 12 protruding from opposite ends thereof.

According to the invention, at least one of the leads, say the lead 11, is first coated for substantially its entire length other than the root 11*a* thereof that protrudes from the resistor, with a thermo-plastic resin compound or wax 13 of relatively low melting point or low flow point characterized by relatively sharp lowering of viscosity at relatively low temperature. If desired, the root end of the lead could be covered as for instance by suitable tape in order to limit the length of wire to be thus coated by thermo-plastic resin compound or wax in a dipping tank 15 and such tape could be removed after the dipping. Such tape need not be used provided the dipping is controlled to dip the lower lead only for slightly less than its full length into the tank 15. Preferably, the thermo-plastic resin compound or wax is kept in molten condition as a bath T at temperature substantially higher than the melting point, for low viscosity, to assure that only a thin film 13 of the resin compound or wax will form on the lead wire when dipped thereinto.

In the practice of the invention it is preferred to use a thermo-plastic resin compound or wax, the melting point of which is between 90° C. and 125° C.

More specifically, the lead wire may be immersed in the thermo-plastic resin compound or wax T bath to within ⅛″ from the resistor at a temperature of 90° C. to 200° C. but in general, a temperature of 160° C. is ordinarily adequate to assure the desired thinness of film on the lead wire. The leads may be withdrawn slowly from the bath in a period of time of less than one minute, ordinarily in from 20 to 40 seconds and then allowed to cool to room temperature.

The unit is then submerged (desirably after pre-heating in a circulating air oven to a temperature sufficient to melt or render flowable the thermo-plastic coating 13 on the lead wire for a period ordinarily of not over 10 minutes) in a second bath of thermo-setting resin, which bath may be an initially liquid resin compound or wax or may be prepared from such resin compound in initially powder or paste form. This resin compound may desirably be an epoxy resin or a polyester compound maintained as a molten bath S in tank 16. Desirably the bath of resin is thixotropic in character, and is vibrated vigorously during the immersion, which may take less than a minute, ordinarily 20 to 40 seconds, followed by slow withdrawal from the tank in from 20 to 120 seconds.

The unit when removed from the tank, has the coating 17 of thermo-setting resin S about the entire surface of the body of unit 10, as well as at 17 about the lead 11 that had previously been coated with thermo-plastic resin 13. As shown in FIGS. 3 and 4, the unit 10 has a coating 17 of thermo-setting resin thereon, which coating extends as at 17 over the entire length of the lead wire 11, that had first been coated as at 13 with thermo-plastic resin 13. The other lead wire 12 remains uncoated, except for its root 12a that may have the thermo-setting resin coat 17 thereon.

The unit, as thus far described, as shown in FIGS. 3 and 4, is now placed in a circulating air oven O, or other suitable heating means, with the coated lead wire 11 extending downward. In this circulating air oven the unit is subjected to a temperature higher than the flow temperature of the thermo-plastic resin compound or wax 13, but much below that which would adversely affect the thermosetting resin 17. In that operation the inner thermoplastic resin coat 13 on the lead wire 11 melts or flows and thus runs off, carrying with it the thermo-setting resin outer coating 17 on the lead wire and leaving that wire clean, without affecting the thermo-setting resin coating on the body of the unit.

The unit with its clean lead wires 11 and 12 may then be cured in conventional manner, at desired curing temperature, as for instance 180° F. for a sufficient length of time, i.e., from 1 to 16 hours. With epoxy resin this period might be in the order of 6 hours.

Thus, by the simple expedient of dipping one of the lead wires into thermo-plastic resin up to its root end, allowing that thermo-plastic resin to set, followed by dipping the same lead wire, as well as the body of the unit itself and desirably also the root end only of the other lead wire into thermo-setting resin, the twice immersed lead wire with its inner coating of thermo-plastic resin compound or wax, and its outer coating of thermosetting resin becomes automatically cleaned when hanging downward in a circulating air oven. The need for cleaning such lead by abrasion or other mechanical treatment or manipulation is completely obviated and yet the lead becomes perfectly clean.

Among the preferred thermoplastic undercoatings for the lead wire or lead wires are the following:

*Example A.*—Low molecular weight polyethylene compounds, a desirable form of which is A(1)—Epolene E, of molecular weight of 2500 of Eastman Chemical Products, Inc., or A(2)—Epolene C of molecular weight of 2500 of Eastman Chemical Products, Inc.

Any of the low molecular weight polyethylene compounds set forth consists in addition to the polyethylene compound, of hydrocarbon wax admixed therewith, which admixture has a sharper melting point of 105 to 110 degrees C. than has the polyethylene as such.

*Example B.*—Polyamides—illustrative of which are

B(1) Versamid 930 of melting point of 105 to 115 degrees C. (General Mills), or

B(2) Versamid 950 of melting point 95 to 105 degrees C. (General Mills.)

*Example C.*—Desirable waxes are compound No. D–726, Biwax Corp., melting point 107 to 110 degrees C., or No. C–748, Biwax Corp., melting point 92 to 95 degrees C.

While the use of low molecular weight polyethylene compound without admixture of wax is within the scope of the invention in its broader aspect, it is less desirable, because it does not have as sharp a melting point as the mixture with wax.

Examples of thermosetting thixotropic resins used as the permanent coating according to the invention are the following:

*Example 1.*—A liquid epoxide resin, commercially obtained and sold under the trade name Shell "Epon 828," a condensation product of bisphenol A and epichlorhydrin, and of the general chemical configuration

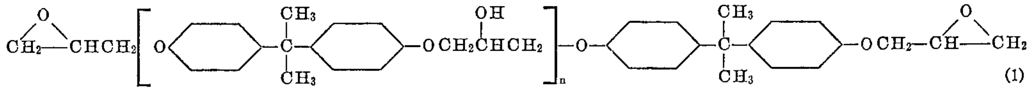

(1)

where *n* is between 0 and 1 was used as the basic resin. To 70 parts by weight of this resin are added 6.9 parts by weight of dicyandiamide, in powdered form. The mixture is stirred and then 3.2 parts of a treated clay are added. This mass is passed through a three roll mill to give a smooth homogeneous system. A dry blended mixture of 10.4 parts 325 mesh mica dust and 7.2 parts fine aluminum silicate powder is then added. After the further addition of two parts coloring pigment the mix is again passed through a three roll mill.

This compound is liquid at room temperature and is heated to 85° C. for use at which temperature it has a viscosity of 10,000 cps. and a specific gravity of 1.4 at room temperature. It is highly thixotropic in nature. When fully cured its volume resistivity exceeds $10^{16}$ ohm cm. at 75° F.

*Example 2.*—A liquid epoxide resin, commercially obtained and sold under the trade name Ciba's "Araldite 6010," a condensation product of bisphenol A and epichlorhydrin, and of the general chemical configuration (1) as defined under Example 1, where *n* is between 0 and 1, is used as the basic resin. To 48 parts by weight of this resin is added 7 parts by weight of a treated clay and 37 parts by weight of hydrated aluminum silicate dust. This mixture is pebble milled for 36 hours. To 44 parts of the resulting paste-like mass is added 44 parts of Araldite 6010 and 4 parts of butyl glycidyl ether. The mixture is stirred well. Before use, 14.5 parts of a eutectic mixture of meta phenylene diamine and dimethyl aniline is added and again well mixed, followed by deaeration under vacuum. The viscosity of this thixotropic compound is 5,000 cps. at 75° F., its specific gravity at 25/25 C. is 1.33. The fully cured material has a volume resistivity of $2.3\times10^{12}$ at 125° C., a dielectric constant of 5.2 at 1,000 cycles per second and at 25° C., and a power factor of 1.1% at the same condition of measurement.

*Example 3.*—A polyester resin derived from the reaction of a carboxylic anhydride and a polyglycol (such as the condensation product of maleic anhydride and diethylene glycol) is diluted with monomeric styrene. A commercial resin of this type, namely Laminac 4111 (American Cyanamid Co.) is used. To 82.13 parts by weight of this liquid resin is added 16.55 parts of a treated clay and 1.32 parts of iron oxide powder. This mixture is passed through a three roll mill. To 22.78 parts of this heavy mass is added 52.85 parts of Laminac 4111, 4.32 parts of fine asbestos powder, and 8.2 parts of mica powder. The entire mixture is well stirred and then again passed twice through a three-roll mill. Immediately before use there is added to 100 parts of the complete mixture 11.85 parts of a catalyst solution consisting of 0.8 part benzoyl peroxide and 0.8 part lauroyl peroxide dissolved in 10.25 parts of monomeric styrene. The resulting strongly thixotropic dipping compound has a working life of 24 hours at 72° F.

Any of the examples of thermo-plastic resin compound or wax above-outlined as Examples A, B and C for effecting the undercoat of thermo-plastic compound or wax film on the lead wire may be used by dipping in tank 15 and any of the thermo-setting compositions, illustrative examples of which are set forth as Examples 1, 2 and 3, may be used by dipping in tank 16 to apply such thermo-setting resin upon the lead wire that had been pre-coated, as well as upon the body of the unit. Upon then suspending the unit after removal from tank 16 in a circulating air oven at a temperature higher than the flow temperature of the thermo-plastic resin or wax, but much below that which would adversely affect the thermo-setting resin, the inner thermo-plastic resin compound or wax coating on the lead wire 11 melts or flows and thus runs off, carrying with it the outer thermo-setting resin coating 17 on the lead wire and leaving that wire clean. Thereafter the unit is cured in conventional manner at desired curing temperature, as for instance, 180° F. With epoxy resin this period might be in the order of six hours.

It will of course be understood that where the unit is to have a double coating of thermo-setting resin the procedure above set forth could readily be repeated prior to the final curing operation by dipping the other lead wire 12 of the resistor into the thermo-plastic resin bath T in the manner above set forth, followed by the dipping of that lead wire 12 and the unit into bath S in manner above described, followed by the heating in the air oven, with lead wire 12 now hanging downward, so that the thermo-plastic resin coating on lead wire 12 upon reaching the flow temperature carries off therewith the thermo-setting resin about the thermo-plastic resin coat on said lead wire 12.

As many changes could be made in the above method, and many apparently widely different embodiment of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. The method of preparing plastic coated electrical devices of the type with two electrical leads, protruding from opposite ends thereof which comprises applying substantially to the entire length other than the root end of one of said leads a liquid coating of material selected from the group consisting of thermo-plastic resin compound and hydrocarbon wax, thereupon dipping the entire surface of the coated lead and the entire surface of the device other than the opposite lead into a liquid bath of thermo-setting resin thermo-settable at a temperature above the flow temperature of the thermo-plastic resin, removing the coated device from the bath, and thereupon heating the device to not less than the flow temperature of the thermo-plastic resin and well below the thermo-setting temperature with the lead that had been coated therewith extending downward, whereby the thermo-plastic resin will flow downwardly and thereby clean the lead of both the thermo-plastic undercoat and the thermo-setting overcoat thereon.

2. The method recited in claim 1 in which the device is a fixed resistor of the precision type and the electrical lead is an axial lead wire.

3. The method recited in claim 1 in which the thermo-plastic undercoating on the lead is of melting temperature between 90° C. and 125° C.

4. The method recited in claim 1 in which the thermo-setting resin bath for coating the unit is thixotropic in character and in which the bath is vibrated during dipping.

5. The method recited in claim 1 in which the device is submerged in the thermo-setting resin bath with the root end only of the protruding lead covered by said bath.

6. The method recited in claim 1 in which the second of the two leads is thereupon coated with thermo-plastic resin and thereupon dipped into the bath of thermo-setting resin with the unit other than the previously cleaned lead submerged therein and the heating to at least flow temperature of the thermo-plastic resin is repeated with said now coated second lead extending downward to cause the thermo-plastic resin to flow and free said latter lead of both the thermo-plastic undercoat and the thermo-setting overcoat.

7. The method recited in claim 6 in which in each of the two immersions of the unit in the thermo-setting bath, the root only of the protruding wire lead is submerged in such thermo-setting resin.

References Cited in the file of this patent

UNITED STATES PATENTS

| | | |
|---|---|---|
| 2,562,741 | Roberts et al. | July 31, 1951 |
| 2,726,306 | Ferguson | Dec. 6, 1955 |
| 2,829,320 | Dimond | Apr. 1, 1958 |
| 2,949,388 | Flournoy et al. | Aug. 16, 1960 |